(12) United States Patent
Mayer et al.

(10) Patent No.: US 8,001,945 B2
(45) Date of Patent: Aug. 23, 2011

(54) RESONATOR FOR AN INTAKE SYSTEM OF A MOTOR VEHICLE

(75) Inventors: Gerhard Mayer, Pleidelsheim (DE); Torsten Fritzsching, Vaihingen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 690 days.

(21) Appl. No.: 12/066,856

(22) PCT Filed: Aug. 29, 2006

(86) PCT No.: PCT/EP2006/065768
§ 371 (c)(1),
(2), (4) Date: Mar. 14, 2008

(87) PCT Pub. No.: WO2007/031401
PCT Pub. Date: Mar. 22, 2007

(65) Prior Publication Data
US 2008/0236534 A1    Oct. 2, 2008

(30) Foreign Application Priority Data
Sep. 16, 2005 (DE) .................. 20 2005 014 688

(51) Int. Cl.
*F02M 35/10* (2006.01)
(52) U.S. Cl. ................................. 123/184.57; 181/229
(58) Field of Classification Search ............... 123/198 E, 123/184.53, 184.57; 181/229
See application file for complete search history.

(56) References Cited

U.S. PATENT DOCUMENTS
5,756,945 A    5/1998   Maeda et al.

FOREIGN PATENT DOCUMENTS
| DE | 4435296 A | 4/1996 |
| DE | 10036588 A1 | 2/2002 |
| DE | 10058479 A1 | 5/2002 |
| EP | 1132611 A1 | 9/2001 |
| JP | 2005264886 A1 | 9/2005 |

*Primary Examiner* — Noah Kamen

(57) ABSTRACT

A resonator for an air intake system of a motor vehicle has a housing and at least one resonator chamber enclosed by the housing. At least one air intake opening for fresh air is provided in the housing and opens into the resonator chamber. At least one air exhaust opening for fresh air is provided in the housing and opens into the resonator chamber. The at least one air exhaust opening is also an intake opening of an auxiliary device, especially an air compressor.

18 Claims, 5 Drawing Sheets

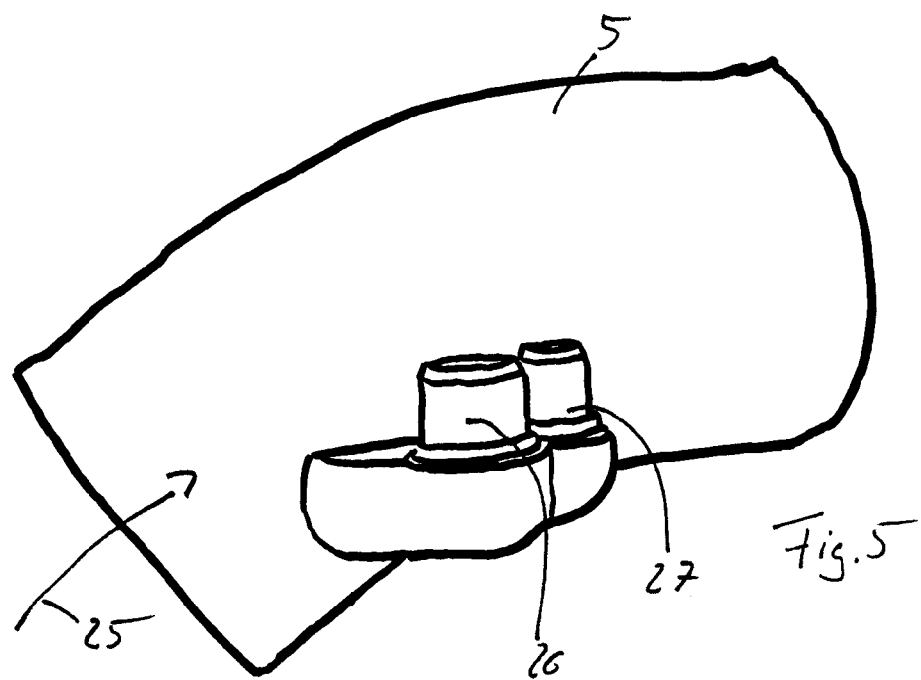
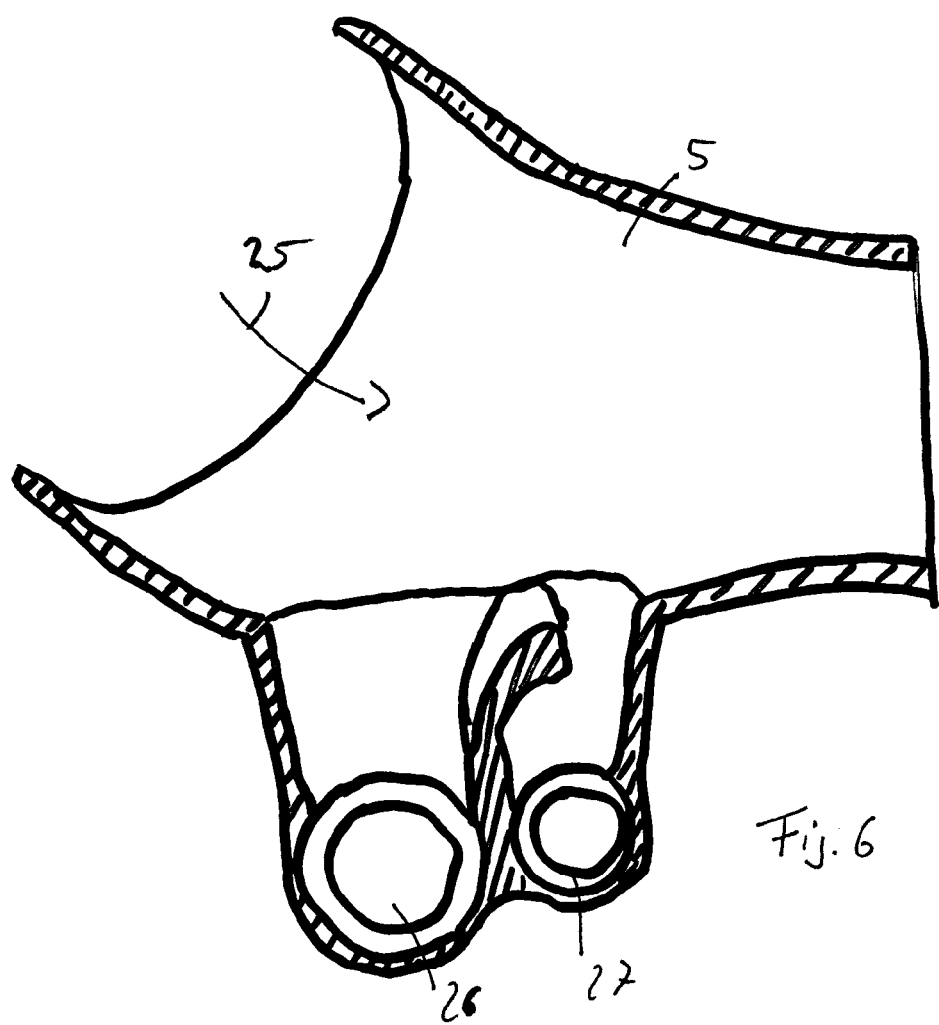

RESONATOR FOR AN INTAKE SYSTEM OF A MOTOR VEHICLE

BACKGROUND OF THE INVENTION

The invention concerns a resonator for an air intake system of an internal combustion engine of a motor vehicle, comprising a housing and at least one resonator chamber enclosed by the housing, wherein in the housing at least one air intake opening and at least one air outlet opening for the resonator chamber is provided. Moreover, the invention concerns an intake line/resonator/auxiliary device system for an internal combustion engine of a motor vehicle.

PRIOR ART

It is desirable that in motor vehicles air intake systems are used that produce a minimum of sound energy. Sound energy is produced when fresh air is taken in through an intake line into the internal combustion engine. Vibrations are generated by the supplied air in the intake line, and this causes undesirable sound emissions. It is known to employ various types of resonators, for example, Helmholtz resonators, in order to reduce the intake sound of the internal combustion engine. Resonators minimize vibrations in that the air within the resonator is caused to be in resonance with the vibrating intake air.

DE 600 17 075 T2 discloses a resonator. The resonator is substantially comprised of a housing that encloses a large-volume resonator chamber. By means of an air conduit the resonator chamber is connected to the intake line of an air intake system of an internal combustion engine of a motor vehicle. Through the air conduit a partial volume flow of the intake line communicates with the air in the resonator chamber. Vibrations in the intake line are reduced as a result of the occurring resonance vibrations and this leads to reduced noise emissions. A disadvantage of the known resonator is the large amount of space required as a result of the large-volume resonator chamber.

U.S. Pat. No. 5,756,945 A discloses a resonator for reducing the noise emission of an intake line of an internal combustion engine of a motor vehicle. The known resonator is characterized in that the entire volume flow of the intake line is conveyed into the resonator chamber of the resonator. For this purpose, a first air conduit coming from an air filter is provided and passes through an air inlet opening into the housing and ends openly in the resonator chamber. At a spacing to this first air conduit the mouth area of a second air conduit is arranged within the resonator chamber. This second air conduit extends through an air outlet opening in the housing directly into the internal combustion engine. A disadvantage of the known resonator is also the large space required for the resonator.

DISCLOSURE OF THE INVENTION

The invention has the object to provide a resonator as well as an intake line/resonator/auxiliary device system with which the limited space in the internal combustion engine area of a motor vehicle can be utilized better.

According to the invention it is provided that the resonator not only functions as a sound absorber but at the same time functions also as an air distributor. The fresh air that passes through an air intake opening from the intake line of an internal combustion engine of motor vehicle into the resonator chamber is guided to an auxiliary device, in particular, an air compressor, by means of an air exhaust opening of the resonator chamber that is spaced from the air intake opening. In this way separate supply conduits for the auxiliary device are no longer needed so that, in turn, the limited space that is available is used optimally. At the same time, an additional surprising positive effect results. The resonator serves not only as a sound absorber for the intake line but also dampens at the same time vibrations and thus sound emissions caused by the auxiliary device, in particular the air compressor. Air compressors are usually utilized for making available compressed air for compressed air devices such as compressed air brake systems in trucks. Since usually piston compressors are utilized as air compressors, a significant sound emission is to be expected without the sound absorbing function.

In the intake line/resonator/auxiliary device system according to the invention at least one resonator is provided that has an air exhaust opening that is connected to the intake line of an auxiliary device, in particular an air compressor. The air intake opening of the resonator is connected to the intake line of the internal combustion engine of the motor vehicle. The resonator according to the invention is embedded between the intake line and the auxiliary device and takes on a sound absorbing function for the intake line as well as for the auxiliary device and serves additionally as an air distribution device or air guiding device to the auxiliary device, in particular the air compressor.

In order to be able to utilize the space needed by the resonator even better, one embodiment of the invention proposes that in the resonator chamber at least one air conduit is arranged that is gas-tight relative to the resonator chamber and connects an inlet opening and an outlet opening in the housing with one another. When the outlet opening is in communication with the intake line of the internal combustion engine of the motor vehicle, it is possible to convey by means of the air conduit within the resonator, for example, crankcase venting gases to the intake line and the internal combustion engine. An additional air conduit outside of the resonator is advantageously not required. The air conduit can be arranged, for example, in such a way that it enters on one side of the resonator through an inlet opening and exits from the resonator through an outlet opening spaced from the inlet opening. However, in order to be able to install and dismount the resonator as a separate assembly in the area of the internal combustion engine, it is advantageous when connectors are provided in the area of the inlet opening as well as in the area of the outlet opening in order to connect the inlet opening to a first component and the outlet opening to a second component, preferably the intake line, in a gas-tight and releasable way. As a coupling mechanism for fixation of the air conduit to the connectors a locking mechanism can be provided, for example. In the latter embodiment the air conduit does not pass through the housing of the resonator but connects the inlet opening to the outlet opening within the resonator chamber.

In a further embodiment of the invention it is advantageously provided that the inlet opening of the air conduit is at the same time an outlet opening of the auxiliary device, in particular, for residual air. The residual air that is produced in operation of the auxiliary device and is particularly contaminated with oil droplets, can be supplied through the air conduit to the intake line of the internal combustion engine. In particular when an air compressor is used as an auxiliary device, oil-containing residual gases are produced that can be combusted in the internal combustion engine.

In order to have to provide only one connector, if possible, for discharging residual air to the resonator as well as to the intake line, advantageously a common outlet opening for several air conduits is provided. Several, preferably all, air conduits open in such an embodiment in a common outlet opening that can be coupled, for example, to the intake line of the internal combustion engine.

In order to enable assembly and disassembly as fast and simple as possible of the resonator according to the invention, in one embodiment of the invention locking means are provided for locking the resonator on one or several auxiliary devices in the internal combustion engine compartment and/or for locking on the intake line of the internal combustion engine of the motor vehicle. Advantageously, the locking action is such that the connection of the resonator to the auxiliary device and/or to the intake line is realized in a gas-tight way. Seals for sealing the connection can be provided on the resonator housing as well as on the auxiliary device or on the intake line. By means of the inventive design of the resonator, it is possible to couple the resonator in a simple way to the auxiliary device, in particular, the air compressor, or to the intake line.

In order to provide the necessary pressure for producing a gas-tight connection, it is advantageously provided that the locking means are arranged in the area of the air intake opening and/or the air exhaust opening, in particular concentrically about them. Additionally or alternatively, locking means can also be provided in the area of the air intake opening and/or the air exhaust opening.

In order to be able to maintain the basic configuration of the resonator, independent of whether one or several air conduits are provided, one embodiment of invention provides a closure cap for the outlet opening of resonator chamber that is not needed. This is relevant, for example, in an application where the same resonator housing is to be employed in motor vehicles with one or two air compressors. When the resonator according to the invention is used with only one air compressor, the outlet opening of the resonator chamber that is not needed can be provided with a closure cap. Alternatively or additionally, closure caps can be provided for air inlet and air exhaust openings that are not needed.

In one embodiment of the invention it is provided that the air intake opening does not open directly into the resonator chamber but that the air intake opening opens within the resonator chamber in a connecting socket for connecting at least one pipe or opens directly into a pipe. The pipe forms the resonator stretch of the resonator or is at least part thereof. In order to be able to optimally utilize the available space of the resonator chamber within the housing the pipe is advantageously of a bent configuration.

In a further embodiment of the invention, it is provided that a pipe that is preferably bent and opens into the resonator chamber is connected to the connecting socket.

According to a further advantageous embodiment of the invention, it is provided that a support structure is provided for the resonator pipe. This support structure is preferably formed integrally on the connecting socket for the pipe and extends into the pipe mouth. In this way, undesirable pipe vibrations are prevented.

BRIEF DESCRIPTION OF THE DRAWINGS

Further advantages and expedient embodiments of the invention can be taken from the dependent claims, the description, and the drawings.

It is shown in:

FIG. 1a to FIG. 1e five views of a resonator with an air intake opening and two air exhaust openings that are also intake openings of an auxiliary device, wherein FIG. 1a is a top view, FIG. 1b is a side view, FIG. 1c is a bottom view, FIG. 1d is a first end view, and FIG. 1e is a second end view;

FIG. 5 an illustration of an intake line with connectors for connecting to a resonator; and FIG. 6 a section illustration of the intake line according to FIG. 5.

EMBODIMENT(S) OF THE INVENTION

Figure 1:
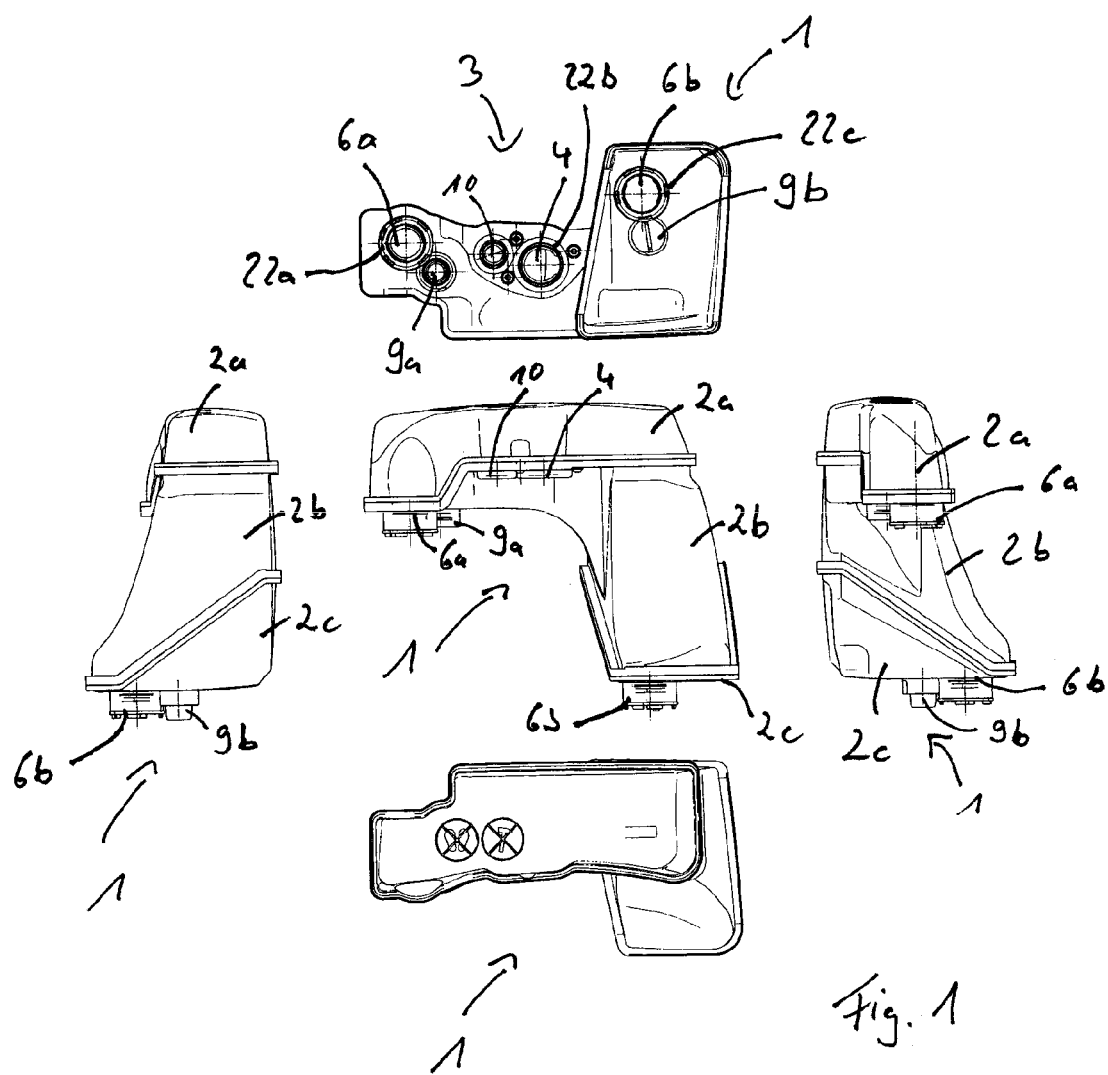

In the Figures same components or components with same function are identified with same reference numerals.

In FIG. 1a to FIG. 1e, a resonator 1 is shown in five different views. The illustrated resonator 1 is a Helmholtz resonator. The resonator 1 has a three-part housing 2 with a housing top part 2a, a housing center part 2b, and a housing bottom part 2c. The three housing parts 2a, 2b, 2c are airtightly connected to one another, in particular by welding. Since the housing is assembled of individual parts, the resonator 1 can be matched to various mounting requirements by exchange of an individual part. Preferably, the resonator can be matched as a result of the modular configuration to diverse motor variants. The central illustration FIG. 1b shows the resonator 1 in a side view. This side view shows the substantially L-shaped configuration of the resonator 1.

FIG. 1c shows a bottom side 3 of the resonator 1. An air intake opening 4 for fresh air opens at the bottom side 3 and communicates with an intake line 5, illustrated in FIG. 5 and FIG. 6, of an internal combustion engine that is not illustrated. Moreover, on the bottom side 3 of resonator 1 a first air exhaust opening 6a and a second air exhaust opening 6b that is spaced from the first one are provided. The first and the second air exhaust openings 6a, 6b are also intake openings of the air compressors 7a and 7b illustrated in FIG. 4. Through the only air intake opening 4 fresh air flows from the intake line 5 into the resonator chamber 8 enclosed by the housing 2 and shown in FIG. 2 and FIG. 3 and flows through the air exhaust openings 6a, 6b into the air compressors 7a, 7b. Important for the function of the resonator 1 is that the air intake opening 4 is positioned in the resonator chamber 8 at a sufficiently large spacing relative to air exhaust openings 6a, 6b. Based on the illustrated configuration, the resonator 1 has, on the one hand, the task of reducing vibrations in the intake line 5 and, on the other hand, functions as an air distributor for the air compressors 7a, 7b. At the same time, the resonator 1 functions as a sound absorber for the first and second air compressors 7a, 7b.

Furthermore, on the bottom side 3 of the resonator 1 a first and a second air inlet openings 9a and 9b for residual air are present. Additionally, a common air outlet opening 10 for residual air is provided directly adjacent to the air intake opening 4 for fresh air. The air inlet openings 9a and 9b for residual air are also air outlet openings of the air compressors 7a, 7b. The oil-contaminated residual air introduced into the air inlet openings 9a, 9b is supplied through the air outlet opening 10 to the intake line 5 and thus introduced into the internal combustion engine.

Figure 2:
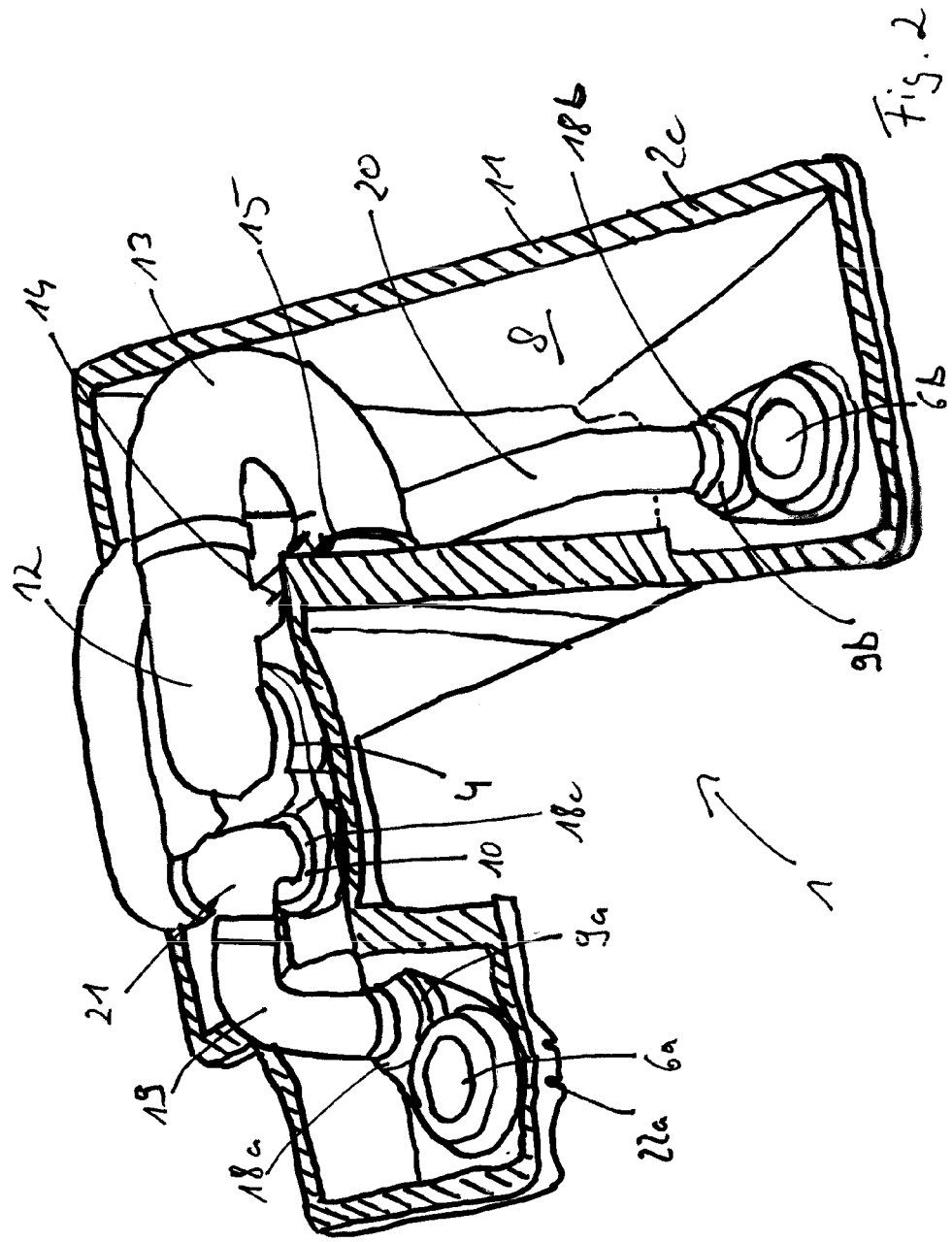
FIG. 2 an illustration of a resonator with opened housing wherein in the resonator chamber two air conduits for residual air are arranged.

In FIG. 2 only the housing bottom part 2c of the housing 2 is shown so that a view of the interior of the resonator 1 is possible. The contact surface 11 of the housing bottom part 2c for contacting the housing center part 2b is illustrated with cross-hatching. In the illustrated embodiment, this is not meant to illustrate a cut surface. Of course, the housing bottom part 2c and the housing center part 2b could be embodied as a single component. In this case, the contact surface 11 would be a cut surface. However, the described housing configuration with three housing parts 2a, 2b, 2c has the advantage in comparison to a two-part configuration that the resonator chamber 8 is easily accessible for furnishing it with several components.

It can be seen that the air intake opening 4 as well as the first air exhaust opening 6a as well as the second air exhaust opening 6b are arranged on the bottom side 3 of the resonator 1. The same holds true also for the first and the second air intake openings 9a, 9b for residual air. The air outlet opening 10 for residual air is also arranged on the bottom side 3 of resonator 1. It is located in immediate vicinity of the air intake opening 4 for fresh air. The first air inlet opening 9a is arranged immediately adjacent to the first air exhaust opening 6a. Also arranged adjacent to one another are the second air exhaust opening 6b and the second air inlet opening 9b. This arrangement has the advantage that the first air exhaust opening 6a as well as the first air inlet opening 9a can be coupled by means of a common coupling member to the air compressor 7a (compare FIG. 4) and the second air exhaust opening 6b as well as the second air inlet opening 9b can be coupled by a common coupling member to the second air compressor 7b (compare FIG. 4).

The fresh air passes through the air intake opening 4 into a connecting socket 12 that deflects the fresh air in the plane of the drawing to the right. A bent pipe 13 is connected to the connecting socket 12. The pipe ends within the resonator chamber 8 at minimal spacing relative to the housing bottom part 2c. The pipe 13 is part of the resonator stretch of the resonator 1. For stabilizing the connection between the pipe 13 and the connecting socket 12 as well as for avoiding undesirable vibrations of the pipe 13, a support structure 14 is provided that is integrally formed with one end on the connecting socket 12 and with its opposite end supports the mouth 15 of the pipe 13. The fresh air that passes through the mouth 15 into the resonator chamber 8 flows through the first and the second air exhaust openings 6a and 6b directly into the intake passages 16a and 16b of the air compressors 7a and 7b (compare FIG. 4). The air compressors 7a and 7b compress this fresh air and supply it through the connecting lines 17a, 17b to a compressed air system (not illustrated) of the motor vehicle.

About the first air inlet opening 9a for residual air a first connector 18a for an air conduit 19 is arranged. The air conduit 19 is gas-tightly connected to the first connector 18a. A second connector 18b for an air conduit 20 is provided about the second air inlet opening. The air conduit 20 is also gas-tightly connected to the second connector 18b. Both air conduits 19, 20 open in a joining member 21 where both residual flows are combined and supplied to the common air outlet opening 10. The joining member 21 is seated on a third connector 18c which is arranged about the common air outlet opening 10. As already mentioned, the air outlet opening 10 is coupled to the intake line 5 so that the oil-containing residual air can be discharged into the intake line 5.

For mounting the resonator 1 in the internal combustion engine compartment, first, second, and third locking means 22a, 22b, 22c are provided that extend concentrically about the first air exhaust opening 6a, the air intake opening 4 as well as second air exhaust opening 6b. The first and the third locking means 22a, 22c serve for locking the resonator 1 on the air compressors 7a, 7b illustrated in FIG. 4. By means of the second locking means 22b the resonator 1 is releasably secured on the intake line 5.

Figure 3:
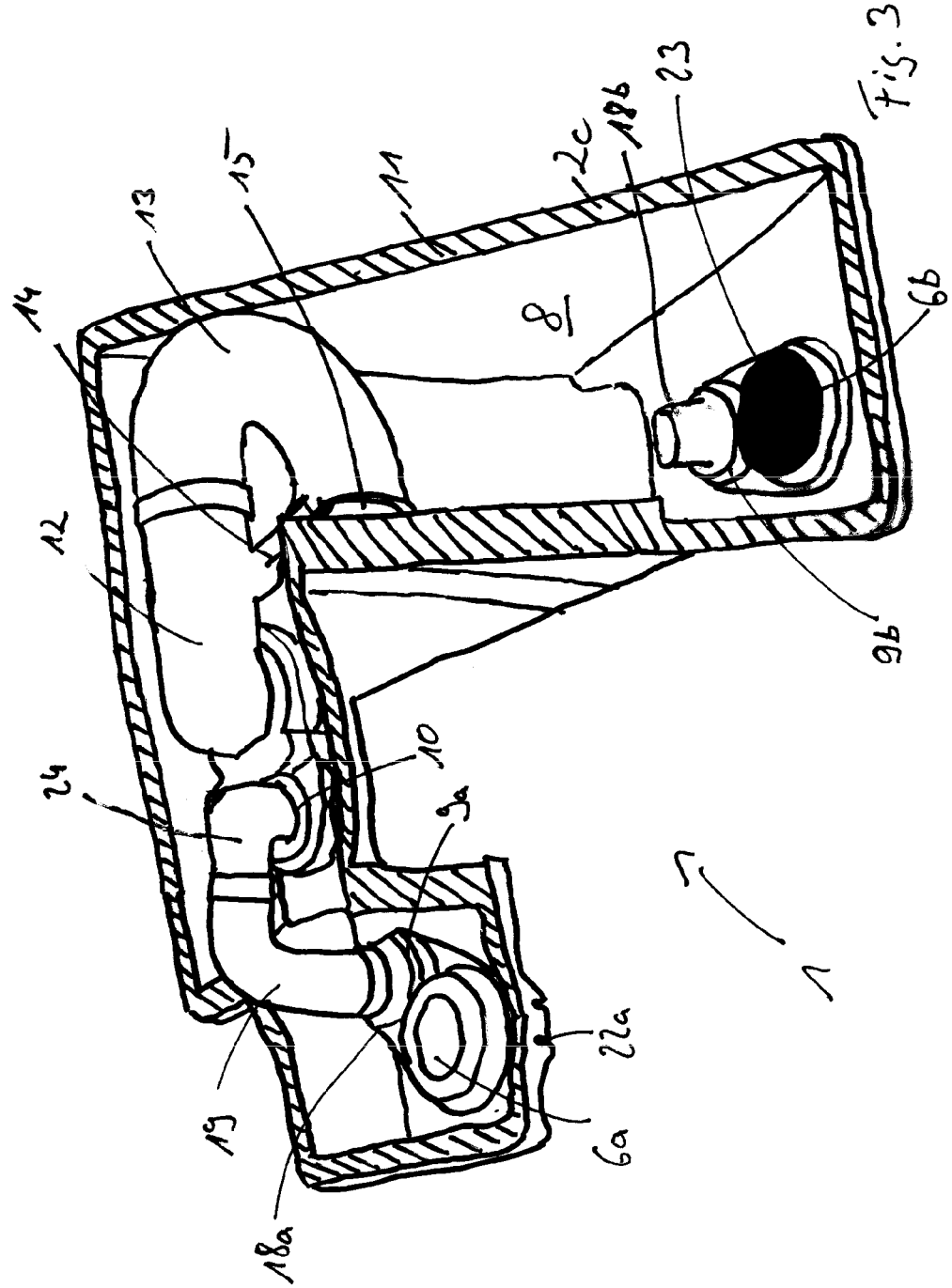
FIG. 3 an illustration of a resonator with opened housing wherein in the resonator chamber only one air conduit for residual air is arranged.

In the following, the embodiment of resonator 1 shown in FIG. 3 will be described. In this connection, only the differences to the embodiment illustrated in FIG. 2 will be discussed. In regard to the common features of the embodiment illustrated in FIG. 3 and the embodiment illustrated in FIG. 2, reference is being had to the description of the embodiment according to FIG. 2. In contrast to the embodiment illustrated in FIG. 2, the second air exhaust opening 6b is gas-tightly closed off by means of closure cap 23. Also, the second connector 18b is closed off. It can be seen that only a single air inlet line 19 is provided that connects the first air inlet opening 9a for residual air to the air outlet opening 10. Instead of the joining member 21 a curved coupling member 24 is provided. In the embodiment illustrated in FIG. 3, the air conduit 20 is not needed. Otherwise, the configuration of the embodiment illustrated in FIG. 3 corresponds to the embodiment illustrated in FIG. 2. The resonator 1 according to FIG. 3 is suitable for use in motor vehicles that require only one air compressor. Since the second air exhaust opening 6b and the second air inlet opening 9b for residual air are not required, they are closed off as described above. In this way, it is possible to employ one and the same resonator housing 2b for different applications. Only small configurational changes in the interior of the resonator 1 must be carried out.

Figure 4:
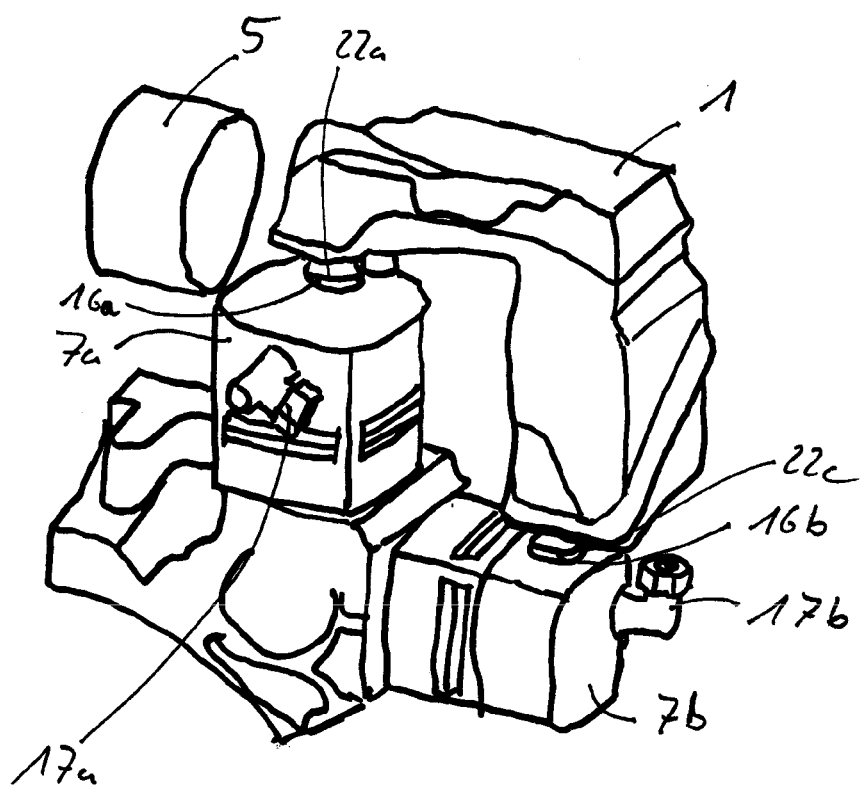
FIG. 4 an illustration of a resonator in mounted position, locked on two spaced-apart air compressors.

FIG. 4 shows the resonator 1 in the mounted state. It can be seen that the tight locking action on the air compressors 7a, 7b is achieved by means of the first and third locking means 22a, 22c. The position of the intake line 5 is indicated schematically. The connection to the intake line 5 is not shown in FIG. 4 for reasons of simplifying the drawing. As a result of the use of locking means 22a, 22c a simple mounting as well as demounting of the resonator 1 is ensured.

In FIG. 5 a detail of the intake line 5 is shown. The arrow 25 symbolizes the flow direction of the sucked-in fresh air. A first connecting socket 26 and a directly adjacently positioned second connecting socket 27 are illustrated. The first connecting socket 26 serves for connecting the air intake opening 4 of the resonator 1. The second connecting socket 27 serves for connecting the common air outlet opening 10 for residual air. It can be seen that the second connecting socket 27 for the residual air is arranged downstream with regard to the air flow of the first connecting socket 26 for supplying fresh air to the resonator chamber 8. In this way, it is prevented that oil-contaminated residual air can reach the resonator 1.

As shown in FIG. 6, the flow of fresh air into the first connecting socket 26 is radial. The fresh air is then deflected by 90 degrees (in FIG. 6 perpendicularly to the plane of the drawing) in the direction toward the resonator 1. The flow of residual air into the intake line 5 is realized also radially. Prior to this, the residual air is deflected by 90 degrees.

What is claimed is:

1. A resonator for an air intake system of a motor vehicle, the resonator comprising:
    a housing and
    at least one resonator chamber enclosed by the housing,
    at least one air intake opening for fresh air provided in the housing and opening into the resonator chamber;
    at least one air exhaust opening for fresh air provided in the housing and opening into the resonator chamber,
    wherein the at least one air exhaust opening is also an intake opening of an auxiliary device;
    at least one air conduit that is arranged in the resonator chamber and is gas-tight relative to the resonator chamber,
    wherein the at least one air conduit connects an air inlet opening provided in the housing and an air outlet opening provided the housing.

2. The resonator according to claim 1, wherein the auxiliary device is an air compressor.

3. The resonator according to claim 1, wherein residual air of the auxiliary device is passed through the at least one air conduit.

4. The resonator according to claim 1, wherein the at least one air inlet opening is also an air outlet opening of the auxiliary device.

5. The resonator according to claim 1, wherein the at least one air outlet opening opens into an intake line of an internal combustion engine.

6. The resonator according to claim 1, wherein the at least one air outlet opening is a common outlet for several of the at least one air conduit.

7. The resonator according to claim 1, further comprising
locking means that gas-tightly lock the resonator to at least one of the auxiliary device and an intake line of an internal combustion engine.

8. The resonator according to claim 7, wherein the locking means are arranged in the area of at least one of at the at least one air intake opening and the at least one air exhaust opening.

9. The resonator according to claim 8, wherein the locking means are arranged concentrically about the at least one air intake opening and the at least one air exhaust opening.

10. The resonator according to claim 1, further comprising a removable closure cap for closing the at least one air exhaust opening.

11. The resonator according to claim 1, further comprising
a connecting socket that is arranged within the resonator chamber,
wherein the at least one air intake opening opens into the connecting socket.

12. The resonator according to claim 11, further comprising
a pipe arranged within the resonator chamber and having a mouth opening into the resonator chamber,
wherein the pipe is bent and is connected to the connecting socket.

13. The resonator according to claim 12, further comprising
a support structure that supports the pipe.

14. The resonator according to claim 1, further comprising
a pipe arranged within the resonator chamber,
wherein the at least one air intake opening opens directly into the pipe.

15. The resonator according to claim 14, wherein the pipe is bent and opens into the resonator chamber.

16. The resonator according to claim 14, further comprising
a support structure that supports the pipe.

17. An intake line/resonator/auxiliary device system for an internal combustion engine of a motor vehicle, wherein the system comprises at least one auxiliary device and a resonator according to claim 1.

18. The system according to claim 17, wherein the auxiliary device is an air compressor.

* * * * *